United States Patent [19]

Brambach

[11] Patent Number: 4,826,723

[45] Date of Patent: May 2, 1989

[54] SANDWICH CONSTRUCTION AND A METHOD OF MAKING A SANDWICH CONSTRUCTION

[75] Inventor: Johan A. Brambach, Leiden, Netherlands

[73] Assignee: Schreiner Luchtvaart Groep B.V., Leiden, Netherlands

[21] Appl. No.: 20,703

[22] Filed: Mar. 2, 1987

[30] Foreign Application Priority Data

Oct. 22, 1986 [EP] European Pat. Off. ........ 86201850.4

[51] Int. Cl.$^4$ .......................... B32B 3/26; B32B 9/00; B32B 27/34

[52] U.S. Cl. .................... 428/284; 156/214; 156/219; 428/163; 428/167; 428/285; 428/286; 428/287; 428/316.6; 428/319.7; 428/412; 428/473.5; 428/474.4

[58] Field of Search ..................... 428/163, 167, 316.6, 428/319.7, 304.4, 316.6, 314.4, 314.8, 317.1, 317.7, 318.6, 319.1, 319.3, 284, 285, 286, 287, 317.9, 412, 473.5, 474.4; 156/214, 219

[56] References Cited

U.S. PATENT DOCUMENTS

| | | | |
|---|---|---|---|
| 3,841,958 | 10/1974 | Delorme | 428/316.6 |
| 3,906,137 | 9/1975 | Bauer | 428/316.6 |
| 4,188,428 | 2/1980 | Wolf | 428/71 |
| 4,331,725 | 5/1982 | Akao | 428/317.5 |
| 4,543,289 | 9/1985 | Park | 428/304.4 |

FOREIGN PATENT DOCUMENTS

| | | | |
|---|---|---|---|
| 1184106 | 3/1985 | Canada | 428/319.7 |
| 0146519 | 6/1985 | European Pat. Off. . | |
| 2545700 | 4/1977 | Fed. Rep. of Germany . | |
| 2906259 | 8/1980 | Fed. Rep. of Germany | 428/318.6 |
| 1362035 | 4/1964 | France | 428/316.6 |
| 2192905 | 2/1974 | France . | |
| 936232 | 9/1963 | United Kingdom | 428/316.6 |
| 1262882 | 2/1972 | United Kingdom . | |

Primary Examiner—William J. Van Balen
Attorney, Agent, or Firm—Burns, Doane, Swecker & Mathis

[57] ABSTRACT

The invention relates to a sandwich construction comprising at least one layer of a thermoplastic synthetic foam having a fiber reinforced plastic sheet bonded to at least one surface thereof, and the softening temperature of the synthetic foam being different from the softening temperature of the synthetic material of the fiber reinforced plastic sheet.

Preferably, this layer is a core layer of fiber reinforced synthetic material having on both sides a layer of the thermoplastic synthetic foam, said core layer being provided on both surfaces with the fiber reinforced plastic sheet.

17 Claims, No Drawings

SANDWICH CONSTRUCTION AND A METHOD OF MAKING A SANDWICH CONSTRUCTION

The present invention relates to a sandwich construction as well as to a method of making it.

In aircraft construction, and especially in the making of so-called ultralight aircraft, it is an object to use materials having a minimum of weight and a maximum of strength and rigidity. It is also important that the materials are properly deformable and interconnectable.

The combination of strength, rigidity and little weight is found in sandwich constructions on the basis of a foam sheet provided with two stiffening sheets. The known constructions often consist of thermosetting foams, such as polyurethane foam, which has a long manufacturing time, is not thermally deformable and hard to process to articles.

The object of the invention is to provide a sandwich construction or laminate which is thermally deformable without any difficulty, and which is sufficiently strong in spite of it having very little weight.

The sandwich construction according to the invention is characterized in that it comprises at least one layer of a thermoplastic synthetic foam having a fiber reinforced plastic sheet bonded to at least one surface thereof, and the softening temperature of the synthetic foam being different from the softening temperature of the synthetic material of the fiber reinforced plastic sheet.

According to one embodiment of the invention the sandwich construction or laminate is composed of a foam core provided on both sides with the fiber reinforced plastic sheet.

In another embodiment the sandwich construction consists of a core layer which itself is composed of two layers of synthetic foam having interposed therebetween a fiber reinforced synthetic material on the basis of, e.g., carbon fibers or nylon fibers, more in particular aromatic nylon fibers such as aramide (Twaron, Kevlar). The core layer of the construction according to this invention is provided on both sides with the fiber reinforced plastic sheet.

The fiber reinforced plastic sheet is preferably a fiber mat, a fibrous web or a fabric of an aromatic polyamide, glass or carbon fibers, impregnated with a polycarbonate or a polyetherimide. In certain cases it is advantageous to arrange the fibers unidirectionally in the sheet.

The sandwich constructon according to the invention has a number of great advantages which particularly manifest themselves in its use in aircraft construction or in the making of articles applied in aircraft. Examples thereof are component parts for aerial and space technology, automobile and shipbuilding industry, such as wings, but also coating sheets, containers, panels, parts of chairs etc.

The material has a considerable strength and a rigidity of its own, so it is possible to keep the construction very thin, e.g., up to a maximum of about 2½ cm. This renders it possible to make articles having various-complicated shapes. In fact, two half sandwich constructions may be started from, each consisting of a layer of thermoplastic synthetic foam and a fiber reinforced sheet. Subsequently, two of these constructions can be shaped each, and the shaped parts can be united with the surfaces which are not provided with the fiber reinforced sheet. If required, a reinforced fibrous web may be interposed between the two parts. The fibers of this fibrous web may be the same as those used on the surface, but it is also possible to use other fibers, depending on the desired properties of the final construction. Suitable fibers are, e.g., carbon fibers, glass fibers and aramide fibers. In connection with the favourable properties carbon fibers and aramide fibers are preferred. The optionally used fibers in the core layer are preferably impregnated with the same synthetic material as used for the outer layer, in which connection especially polycarbonate and polyetherimide are preferred.

The outer surface of the material, i.e. the fibers reinforced plastic sheet, may also be provided with further layers, such as impregnated fabrics or fibrous webs, e.g., consisting of carbon fibers, aramide fibers or glass fibers, or impregnated fabrics or fibrous webs consisting of combinations of two or more of these fibers.

In shaping the construction as described above, one mould on which both parts of the construction are shaped may be started from without any difficulty for not unduly complicate shapes. Because of the little thickness the differences in size are so slight that these can be taken within the normal limits. Of course, this leads to a considerable saving of cost.

The softening temperatures of the synthetic foam and the synthetic material used in the outer layer must be different from each other so as to enable thermal deformation. The specific choice of the materials, particularly the material having the highest softening temperature, is codedermined by the manner of thermal deformation and the requirements to be imposed on the final products.

Preferably, use is made of a combination of materials in which the synthetic foam has the lowest softening temperature. Most preferably, the difference in softening temperature is at least 1° C., preferably at least 5° C., and not more than 250° C.

In deforming the half sandwich construction the material may be heated externally using conventional techniques, such as direct heating or indirect heating. The choice of the specific outer material and proper adjustment of the rate of heating permits controlling the heating so that at the moment the synthetic material of the fiber reinforced plastic sheet begins to soften the foam becomes deformable too. Thus the foam is prevented from collapsing and/or further expanding in the shaping process.

It is a further advantage of the sandwich construction according to the invention that it is possible to bond different parts together. It is even possible to fix two parts longitudinally together, without differences in thickness necessarily being present. This can be obtained by preheating the sandwich construction so that the foam partly or completely collapses, and then bonding a pair of thus treated parts together. Here it is of course essential that the synthetic material of the outer layer is in itself capable of being bonded or glued.

The sandwich construction according to the invention can be manufactured, in any suitable manner, from a synthetic foam, a completely or partly impregnated fibrous web, and optionally a plastic sheet, but the choice of the synthetic foam and the plastic sheet is determined by the requirements as to the hot softening temperature. Thin sheets of a synthetic foam, preferably a polymethacrylateimide foam, are preferably started from, the side to which the fiber reinforced sheet is to be attached being provided at regular distances with shallow grooves. These grooves need not be deeper than 1 or 2 mm and can be arranged at regular or irregular distances, e.g., 1 or 2 mm from each other, and are for the purpose of more properly bonding the fiber reinforced plastic sheet. The thus pretreated side of the sythetic foam sheet may then be provided with a fiber reinforced plastic sheet using a bonding layer, if required. This is appropriately effected by applying a thin plastic sheet to the pretreated side of the synthetic foam sheet, and then applying to the plastic sheet a fibrous web impregnated with the same synthetic material as that of which the plastic sheet is made, and subsequently bonding the assembly together applying heat and pressure. This is accompanied with post-impregnation of the fibrous web by means of the plastic sheet interposed between the two layers, which plastic sheet also effects bonding.

Depending on the contemplated use, various types of synthetic foam may be applied, such as PVC foam, chlorinated PVC foam, PVDC foam and polymethacrylimide foam. This last is preferred in view of the foaming properties. Polymethacrylimide foam can be prepared in the known manner by thermally foaming sheets from a methacrylic acid methacrylonitrile copolymer, which copolymer completely or partly converts to methacrylimide foam during foaming by means of carbon monoxide or another appropriate propellant.

The employed thermoplastic synthetic materials for bonding and impregnating the fibrous webs are preferably polycarbonate and polyetherimide (such as Ultem), because these products combine the desired thermal properties with respect to softening point with excellent bonding and processing characteristics. Polyetherimide is preferred, because this material less tends to drip when heated.

When the different components are adhered together, e.g., foam to foam, or foam to sheet, a softener can be avantageously used for the foam and/or the sheet. This softener is preferably an organic solvent., such as methylene chloride, in which 1-5% by weight of polyetherimide is dissolved, if so desired, which evaporates again owing to the heat supplied for bonding the materials together. When the sheet is adhered to foam provided with grooves, the sheet is treated with the softener, and then the sheet softened at the surface is bonded to the foam by means of heat and pressure.

EXAMPLE

A sandwich construction consisting of a 5 mm thick polymethacrylimide foam and two outer layers of aramide fabric impregnated with polyetherimide was made by providing surfaces of the foam with shallow grooves and successively applying thereto on both sides a polyetherimide sheet, an aramide fabric impregnated with polyetherimide and a polyetherimide sheet, by means of heat and pressure. If necessary, the surfaces of the sheet were softened by means of methylene chloride in which 1-5% by weight of polyetherimide was dissolved, if so desired.

The thickness of the total construction was 5.4 mm, and the weight was 1150 g/m$^2$.

Of the tensile characteristics the tensile strength was 429 MPa, the E modulus was 19 GPa and the elongation at break 2.3%.

The compression tests gave a compressive strength of 35.5 MPa and an E modulus of 5.5 GPa. The bending strength was 27 N mm$^2$/cm. (ASTM C 393-62).

I claim

1. A thermoplastic sandwich construction comprising at least one layer of a thermoplastic synthetic foam having a polyetherimide sheet reinforced with a fabric, bonded to at least one surface of said foam layer.

2. A sandwich construction according to claim 1, wherein the foam is provided on both sides with the sheet.

3. A sandwich construction according to claim 1, comprising a core layer of fabric reinforced synthetic polymeric material having on both sides a layer of the said thermoplastic synthetic foam, said core layer being provided on both surfaces with the said fabric reinforced sheet.

4. A sandwich construction according to claim 3, wherein the said fabric reinforced synthetic material comprises fabric reinforced polyetherimide or fabric reinforced polycarbonate.

5. A sandwich construction as claimed in claim 3, wherein the synthetic foam is a polymethacrylimide foam.

6. A sandwich construction according to claim 3, wherein the fabric composition in the core layer and in the said fabric reinforced sheet may be the same or different and comprises aromatic polyamide fabric, glass fabric or carbon fabric.

7. A sandwich construction as claimed in claim 1, wherein the synthetic foam is a polymethacrylimide foam.

8. A sandwich construction according to claim 1, wherein the said fabric comprises aromatic polyamide fabric, glass fabric or carbon fabric.

9. A thermoplastic sandwich construction comprising at least one core layer of a polymethacrylimide foam, and a fabric reinforced polyetherimide or polycarbonate sheet bonded to at least one surface thereof, said fabric comprises glass fabric, carbon fabric or aromatic polyamide fabric.

10. A sandwich construction according to claim 9, wherein the said core layer includes a thermoplastic synthetic polymeric material reinforced with a fabric comprising glass fabric, carbon fabric or aromatic polyamide fabric, provided on both surfaces thereof with the said polymethacrylimide foam.

11. A method of making a thermoplastic sandwich construction, comprising the steps of providing a sheet of thermoplastic synthetic foam having a plurality of shallow grooves on at least one side, and thermally bonding under pressure a pre-impregnated fiber mat and a plastic sheet to the grooved surface.

12. A method according to claim 11, wherein the fiber mat is impregnated with the synthetic material of which the sheet is made.

13. A method according to claim 11, wherein said bonding step is effected by means of at least one of softener for the foam and a softener for the synthetic material of the plastic sheet.

14. An aircraft component comprising the thermoplastic sandwich construction of claim 1.

15. The aircraft component according to claim 14, wherein said component is an aircraft wing.

16. An automobile component comprising the thermoplastic sandwich construction of claim 1.

17. A ship component comprising the thermoplastic sandwich construction of claim 1.

* * * * *